(12) United States Patent
Andersson et al.

(10) Patent No.: US 8,745,304 B2
(45) Date of Patent: Jun. 3, 2014

(54) USB TO SD BRIDGE

(75) Inventors: Jonathan Andersson, Round Rock, TX (US); Jorge Enrique Muyshondt, Austin, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 469 days.

(21) Appl. No.: 12/787,730

(22) Filed: May 26, 2010

(65) Prior Publication Data

US 2011/0191499 A1 Aug. 4, 2011

Related U.S. Application Data

(60) Provisional application No. 61/300,350, filed on Feb. 1, 2010.

(51) Int. Cl.
*G06F 13/20* (2006.01)

(52) U.S. Cl.
USPC ............... 710/315; 710/5; 710/301; 710/305; 710/306; 710/313; 711/115

(58) Field of Classification Search
None
See application file for complete search history.

(56) References Cited

U.S. PATENT DOCUMENTS

| | | | |
|---|---|---|---|
| 6,941,405 B2* | 9/2005 | Morrow | 710/313 |
| 7,062,585 B2* | 6/2006 | Chen | 710/301 |
| 7,080,189 B1* | 7/2006 | Luttmann | 710/313 |
| 7,412,553 B2* | 8/2008 | Morrow | 710/305 |
| 7,433,990 B2* | 10/2008 | Wurzburg et al. | 710/315 |
| 7,660,938 B1 | 2/2010 | Chow et al. | 710/313 |
| 8,060,670 B2* | 11/2011 | Yu et al. | 710/62 |
| 8,171,242 B2* | 5/2012 | Hong | 711/158 |
| 8,631,185 B2* | 1/2014 | Monks | 710/313 |
| 2004/0059846 A1 | 3/2004 | Liu et al. | 710/62 |
| 2005/0060466 A1 | 3/2005 | Chen | 710/301 |
| 2005/0198424 A1* | 9/2005 | Harari et al. | 710/301 |
| 2005/0240713 A1* | 10/2005 | Wu et al. | 710/314 |
| 2006/0053241 A1* | 3/2006 | Lin et al. | 710/301 |
| 2006/0208097 A1* | 9/2006 | Ando et al. | 235/492 |
| 2006/0282634 A1* | 12/2006 | Ohtsuka | 711/167 |
| 2007/0136501 A1* | 6/2007 | Chang et al. | 710/105 |
| 2007/0174534 A1* | 7/2007 | Wurzburg et al. | 710/315 |
| 2007/0233907 A1* | 10/2007 | Yoshikawa et al. | 710/26 |
| 2008/0059668 A1* | 3/2008 | Charrat et al. | 710/110 |

(Continued)

OTHER PUBLICATIONS

'SanDisk Secure Digital Card Product Manual' Version 1.9, Dec. 2003, SanDisk Corporation.*

(Continued)

*Primary Examiner* — Steven Snyder
(74) *Attorney, Agent, or Firm* — King & Spalding L.L.P.

(57) ABSTRACT

A USB-to-SDIO bridge (UTSB) to efficiently transmit SD/SDIO commands in USB packets. The UTSB may allow the majority of the device drivers for a given SD/SDIO device to remain intact, requiring changes only in the lowest hardware adaptation layer to put a USB wrapper around native SD commands. These commands may be sent over USB-to-SD card reader devices that may include various embodiments of a UTSB, where they may be unwrapped and transmitted to the SD port as if the port were native to the host controller. Additionally, the SD/SDIO commands may be packaged into groups of commands, or transactions, to optimize performance. The host driver may instruct the UTSB bridge device to repeatedly read data from the SDIO device until a communications FIFO on the device is empty (corresponding to a termination condition), and return the collected data to the host.

19 Claims, 5 Drawing Sheets

(56) References Cited

U.S. PATENT DOCUMENTS

| | | | |
|---|---|---|---|
| 2008/0288698 A1* | 11/2008 | Lin et al. | 710/301 |
| 2009/0164678 A1* | 6/2009 | Hu | 710/106 |
| 2009/0204744 A1* | 8/2009 | Chiou et al. | 711/103 |
| 2009/0292865 A1* | 11/2009 | Hong | 711/103 |
| 2010/0023818 A1* | 1/2010 | Schade | 714/718 |
| 2010/0077123 A1* | 3/2010 | Chien et al. | 710/305 |
| 2010/0122021 A1* | 5/2010 | Lee et al. | 711/103 |
| 2010/0161886 A1* | 6/2010 | Toelkes et al. | 711/103 |
| 2010/0198994 A1* | 8/2010 | Lee | 710/5 |
| 2011/0106962 A1* | 5/2011 | Cook et al. | 709/231 |

OTHER PUBLICATIONS

'SD Card Reader Using the M9S08JM60 Series Designer Reference Manual' Rev. 0, Jul. 2008, by Freescale Semiconductor, Inc.*

'SD Card Specification Simplified Version of: Part E1—Secure Digital Input/Output (SDIO) Card Specification' Version 1.00, Oct. 2001, by SD Association.*

'Secure Digital' article from Wikipedia.org.*

'Firmware' article from Wikipedia.org, posted on Dec. 18, 2008.*

Universal Serial Bus Specification Revision 2.0, Apr. 27, 2000, pp. i, ii, and 274.*

'USB Class Codes' from USB.org, Nov. 17, 2009.*

'MAX14500-MAX14503 Hi-Speed USB-to-SDd Card Readers with Bypass,' copyright 2009 by Maxim Integrated Products.*

'AU6336 USB 2.0 SD/MMC Single LUN Card Reader Controller Technical Reference Manual,' copyright 1997-2007, Alcor Micro, Corp.*

Compaq, et al., "Universal Serial Bus Specification Revision 2.0," Apr. 27, 2000, pp. ii-24.

Compaq, et al., "Universal Serial Bus Specification Revision 2.0," Apr. 27, 2000, pp. 25-84.

Compaq, et al., "Universal Serial Bus Specification Revision 2.0," Apr. 27, 2000, pp. 85-152.

Compaq, et al., "Universal Serial Bus Specification Revision 2.0," Apr. 27, 2000, pp. 153-194.

Compaq, et al., "Universal Serial Bus Specification Revision 2.0," Apr. 27, 2000, pp. 195-274.

Compaq, et al., "Universal Serial Bus Specification Revision 2.0," Apr. 27, 2000, pp. 275-296.

Compaq, et al., "Universal Serial Bus Specification Revision 2.0," Apr. 27, 2000, pp. 297-359.

Compaq, et al., "Universal Serial Bus Specification Revision 2.0," Apr. 27, 2000, pp. 360-438.

Compaq, et al., "Universal Serial Bus Specification Revision 2.0," Apr. 27, 2000, pp. 439-554.

Compaq, et al., "Universal Serial Bus Specification Revision 2.0," Apr. 27, 2000, pp. 555-622.

* cited by examiner

USB TO SD BRIDGE

PRIORITY INFORMATION

This application claims benefit of priority of U.S. provisional application Ser. No. 61/300,350 titled "USB to SDIO Bridge" filed Feb. 1, 2010, whose inventors were Jonathan Andersson and Jorge Enrique Muyshondt, which is hereby incorporated by reference in its entirety as if fully and completely set forth herein.

BACKGROUND OF THE INVENTION

1. Field of the Invention

This invention relates generally to Universal Serial Bus (USB) interfaces and Secure Digital (SD) device interfaces, and more particularly to the design of a USB-to-SD bridge.

2. Description of the Related Art

The Universal Serial Bus (USB) was developed to offer PC users an enhanced and easy-to-use interface for connecting an incredibly diverse range of peripherals to their computers. The development of the USB was initially driven by considerations for laptop computers, which greatly benefit from a small profile peripheral connector. Among the many benefits of the USB is a reduction in the proliferation of cables that can affect even the smallest computer installations. In general, USB has become the interface of choice for PCs because it offers users simple connectivity. USB eliminates the need to have different connectors for printers, keyboards, mice, and other peripherals, and supports a wide variety of data types, from slow mouse inputs to digitized audio and compressed video. In addition, USB devices are hot pluggable, i.e. they can be connected to or disconnected from a PC without requiring the PC to be powered off.

The USB specification has seen various revisions, with the USB 2.0 standard challenging the IEEE 1394 interface ("Firewire") as the interface of choice for high-speed digital video, among others. With the proliferating design of increasingly smarter, faster, and smaller peripherals, the On-The-Go (OTG) Supplement to the USB 2.0 Specification was developed to address the growing popularity of the portable electronic devices market. Some of the advantages of the USB and OTG include the built-in support in more than 1.4 billion USB enabled PCs and peripherals shipped worldwide, smooth and trouble-free experience for the user through a compliance and logo program operated by the USB-IF, a wide variety of USB solutions such as intellectual property (IP) blocks, system-on-chip (SOC) parts, discrete chips, software drivers and systems offered by a large group of industry vendors, and design flexibility based on system needs.

OTG devices typically do not require a PC host, and can communicate directly with each other. For example, a PDA may act as a USB host with the capability to print directly to a USB printer, while also acting as a USB peripheral to communicate with a PC. In general, designers are facing increasing pressure to design smaller and faster products in less time and at lower cost. Concurrently, the introduction of smaller deep sub-micron processes present new challenges, such as integrating the physical layer (PHY-transceiver) analog circuitry required by technologies such as USB and OTG, leading to increased man-hours, fiscal and time investment, and silicon revisions. One way to increase time-to-market while keeping costs low is to provide the PHY in a separate chip. In such a case the designer can typically integrate most of the USB digital logic into the application specific integrated circuit (ASIC) in a small amount of time, and connect to a proven external PHY already available on the market.

Following the release of the USB 2.0 specification, Intel released the USB 2.0 Transceiver Macrocell Interface (UTMI) specification. UTMI defined an interface between two IP blocks, the USB Transceiver Macrocell (IP) and the USB Link layer (SIE). For example, the UTMI can be used to interface between a USB Link and a USB PHY. The signals for a UTMI interface with an 8-bit bi-directional data bus. Typically a minimum of 22 signals is required between the Link and the PHY for a device.

Subsequently, an extension of the original UTMI specification the UTMI+ specification was developed to meet the emerging need of building embedded host and OTG capabilities into USB devices. While the original UTMI specified an interface not meant to couple discrete ICs, the UTMI+ in essence introduced host and On-The-Go capabilities to USB systems. Using UTMI as a starting point, UTMI+ incrementally adds new functionality and interface signals to the Link and PHY. The additional signals total 33 for a full OTG UTMI+ interface. Designers can reuse all blocks from their original UTMI IP, and need only add the new circuits required for host or OTG support. This approach works well for UTMI+, as USB peripherals need only a subset of host and OTG functionality. UTMI+ introduced four levels of functionality, each higher level increasing the complexity required in both hardware and software while remaining completely backward compatible with lower levels.

A Low Pin Interface (LPI) UTMI+ specification, referred to as ULPI, was developed by USB industry leaders in order to provide low-cost USB and OTG PHYs by way of a low-pin, low-cost, small form-factor transceiver interface that may be used by any USB application. Pre-existing specifications, including UTMI and UTMI+ were developed primarily for Macrocell development, and were thus not optimized for use as an external PHY. Building upon the existing UTMI+ specification, the ULPI reduces the number of interface signals to 12 pins, with an optional implementation of 8 pins. As a result, the package size of PHY and Link IC's has generally been reduced, not only lowering the cost of Link and PHY IC's, but also reducing the required size of the associated printed circuit boards (PCBs). Central to the ULPI specification is the LPI, which is in effect a generic bus that defines a clock, three control signals, a bi-directional data bus, and bus arbitration. Typically, a ULPI link will configure the ULPI PHY using register writes on a bi-directional shared data bus. The ULPI PHY is the arbitrator of the 8-bit data bus between the link and the PHY.

Secure Digital (SD) is a non-volatile memory card format widely used in many portable devices such as digital cameras, digital camcorders, handheld computers, laptop computers, personal digital assistants (PDAs), various media players and mobile phones, as well as video game consoles and GPS receivers. The format has gained widespread popularity. Although most SD-cards have the same physical shape and form factor, the respective interfaces of more recent high-capacity (SDHC) cards and extended capacity (SDXC) cards have been modified with respect to the interface of the established format, making some older devices designed for standard SD cards unable to accept and use SDHC and SDXC cards. There are currently three versions of the SD specification: 1.0, 1.1 and 2.0. A simplified version of the host controller interface specification for SD cards (different from the physical specification, which covers the actual cards and their protocol) was released in 2006, and at least Linux drivers for SD cards are now widely available.

In most desktop systems, SD cards are generally read via USB-based card readers. These card readers present a standard USB mass storage interface to memory cards, thereby separating the operating system from the details of the underlying SD interface. However, embedded systems (e.g. portable media players and some cellular phones) typically have direct access to SD cards, which generally requires complete programming information. Desktop card readers can themselves be considered examples of embedded systems for which complete access to the SD specifications may be necessary. Many notebook computers now include SD card readers not based on USB device drivers, essentially accessing the SD card directly in a manner similar to SD card access in embedded systems.

SD supports at least three transfer modes. A 1-bit SD mode using separate command and data channels and a proprietary transfer format, a 4-bit SD mode using extra pins and some reassigned pins, and a serial mode using a Serial Peripheral Interface (SPI) Bus that features a simpler subset of the SD protocol for use with microcontrollers. All cards must support all three modes, except for microSD, for which the serial mode is optional. The cards must also support clock frequencies of up to 25 MHz for regular cards, and 50 MHz for high-speed cards. In addition, a combination of SD card and I/O device, referred to as Secure Digital Input Output (SDIO) device, has found increased use in portable electronics devices, such as PDAs, laptops or mobile phones. SDIO cards are fully compatible with the SD Memory Card host controller (including mechanical, electrical, power, signaling and software). SDIO requires support of an SPI bus topology and supports most standard SD commands.

At the present time, many microcontrollers do not support an SD interface, while they may have built-in USB ports. Systems using SDIO typically have custom device drivers that send SD/SDIO commands directly to an SD standard host controller. Various USB-based solutions typically employ custom device drivers not modeled around industry standards, and as a result, require significant rework to existing SDIO drivers to allow a particular SDIO device to be used. There are no known generic USB-to-SDIO implementations that seek to transport generic SD/SDIO commands and data over USB. Additionally, there are no known implementations that attempt to optimize the SD/SDIO command flow for performance. Another group of solutions (referred to as "Direct Connect with SPI") feature a direct connection from SDIO devices to the microcontroller using SD/SDIO in 1-bit mode, employing an SPI host controller to transport data. These implementations typically require custom, and oftentimes single-device-specific driver stacks. Finally, some solutions (referred to as "Direct Connect with Bit-banging") connect SDIO devices directly to the microcontroller using SD/SDIO in 1-bit mode while manipulating GPIO (General Purpose I/O) pins directly with firmware, also requiring custom, and oftentimes single-device-specific driver stacks.

The above solutions suffer from performance limitations, however. For example, both direct connect methods (Direct Connect with SPI and Direct Connect with Banging) suffer serious performance issues due to the SD bus operating in 1-bit mode, and the relatively low speed of the bus when bit-banged. USB-based solutions potentially suffer from performance issues due to host side latency and lack of command/data flow optimization of multiple small transactions. There may also be host-side driver complexity issues. The implementations mentioned above all suffer from lack of standardization, which typically results in significant driver development for each SDIO device on every platform where the bridge/connection mechanism is to be used.

Other corresponding issues related to the prior art will become apparent to one skilled in the art after comparing such prior art with the present invention as described herein.

SUMMARY OF THE INVENTION

Various embodiments are presented of a USB-to-SD bridge (UTSB). The UTSB is configured to interface between a USB bus and an SD interface. The UTSB may be comprised in a Secure Digital (SD) system, and a host device may communicate with the SD system via USB packets which contain SD commands.

In one embodiment, the host device is configured to perform enumeration with an SD system, wherein the SD system is configured to receive SD commands over USB (universal serial bus). The host device then generates one or more Secure Digital (SD) commands and wraps the SD commands into a corresponding one or more USB packets. For example, the host device may execute an operating system that includes a custom host controller driver which may be configured to perform the wrapping of the SD commands. Additionally, the host device may include a USB driver stack which may include an SD over USB class driver. The USB packets including the SD commands may conform to this driver. The host then transmits the one or more USB packets to the SD system.

The SD system receives the USB packets which comprise the corresponding Secure Digital (SD) command(s) and extracts the SD commands. The SD system may include a circuit or software which implements an SD over USB driver class, and the circuit or software may perform the extraction and may provide the SD commands for execution. The SD commands may be configured (e.g., may be executable) to perform an SD action. The SD system may then utilize the commands, e.g., may perform actions based on the commands or transmit them to another device.

The host and/or the SD system may be configured to analyze the one or more SD commands and modify the one or more SD commands, e.g., to improve performance. For example, the host device and/or the SD system may reorder the SD commands, aggregate at least two of the SD commands, fragment at least one of the SD commands, and/or eliminate at least one SD command, among other possibilities.

One of the SD (or UTSB) commands may be a supervisory command, which specifies a task which requires a plurality of SD commands. For example, the SD system may be or include a communication SDIO device and the supervisory command may instruct the communication SDIO device to read data until a termination condition is reached. In one embodiment, the SD system may include WiFi functionality.

BRIEF DESCRIPTION OF THE DRAWINGS

The foregoing, as well as other objects, features, and advantages of this invention may be more completely understood by reference to the following detailed description when read together with the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, or other device or combinations of devices. In general, the term "computer system" can be broadly defined to encompass any device (or combination of devices) having at least one processor that executes instructions from a memory medium.

Figure 1:
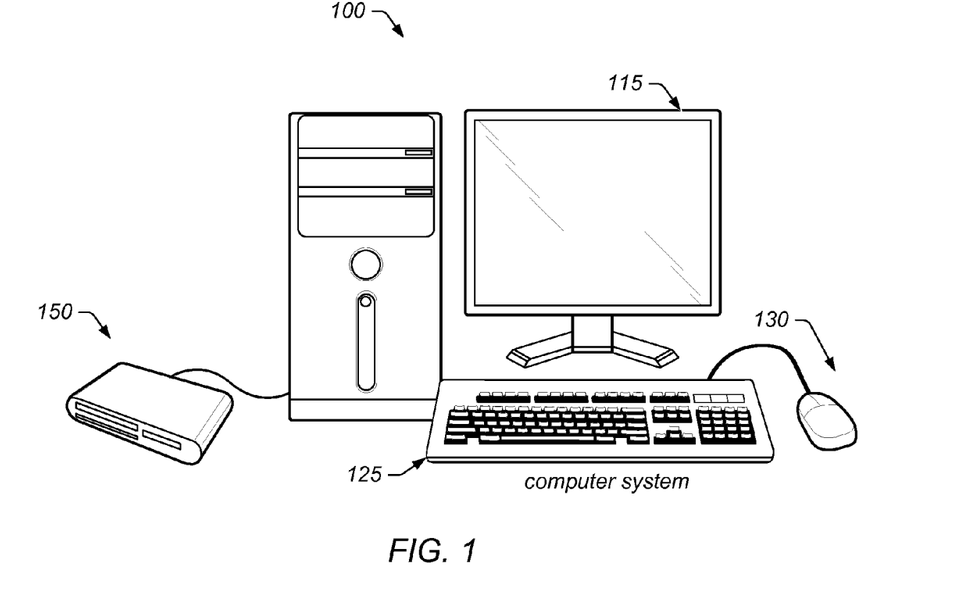
FIG. 1 illustrates a host device coupled to a SD system, according to one embodiment.

FIG. 1—Host Device Coupled to SD system

FIG. 1 illustrates an exemplary host device 100 coupled to a SD system 150. The host device 100 and the SD system 150 may be configured to implement various embodiments described herein.

The host device 100 may include at least one memory medium on which one or more computer programs or software components may be stored. For example, the memory medium may store operating system software, as well as other software for operation of the host device 100. The operating system software may be any of various operating systems, e.g., Linux operating systems, Unix operating systems, Apple operating systems, Microsoft operating systems, Android operating systems, etc. Various embodiments further include receiving or storing instructions and/or data implemented in accordance with the foregoing description upon a carrier medium.

Note that the exemplary host device 100 is shown as a computer system (e.g., as shown, with input devices 125 and 130 and display 115). However, in other embodiments, the host device 100 may be a portable USB device. For example, in one embodiment, the host device 100 may be a USB on-the-go (OTG) device which may be operable to act as a host and a device, e.g., depending on the situation. Thus, according to various embodiments the host device 100 may be any of various appropriate devices.

In the embodiment shown, the SD system 150 is a card reader device (e.g., a USB card reader device). The card reader may have one or a plurality of card slots, as shown. However, the SD system 150 may be any of various devices which include or are able to communicate or perform SDIO commands. For example, the SD system may be dedicated for a single SD memory (e.g., as a hard drive) may include SDIO communication (e.g., over WiFi or Ethernet, for GPS), or may include any other desired functionality. As described herein, the SD system 150 may be configured as a USB device (e.g., a low speed, full speed, high speed, and/or super speed device, although future USB protocols are also envisioned). The SD system may include or be configured to receive combo SD devices, e.g., memory cards that are capable of performing WiFi or GPS communication, among other functionalities.

Note further that the above descriptions of the host device 100 and the SD system 150 are exemplary only and other components and configurations are envisioned. For example, the SD system 150 may be coupled to the host device 100 via a USB hub or wirelessly, as desired. Additionally, the SD system may be incorporated into one or more other devices, such as digital cameras, media playback devices, the input device 130, the display 115, or another device, as desired. Furthermore, while the specific terms "SD", "SDIO", and "MMC" are used throughout the specification, in various alternate embodiments, they may be interchangeable. Thus, FIG. 1 illustrates an exemplary system including a host device and an SD system, according to some embodiments.

Figure 2:
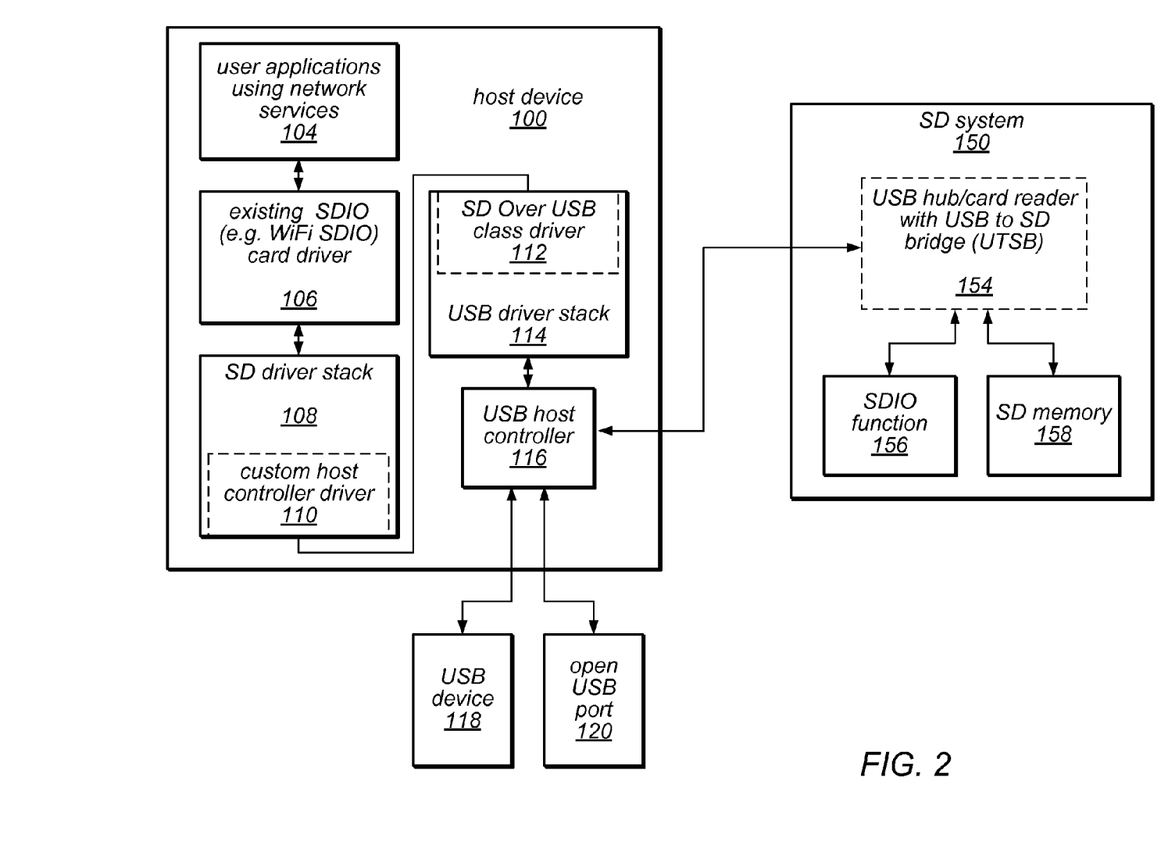
FIG. 2 illustrates a system level block diagram in which an operating system is running a driver for an SDIO device, according to some embodiment of the present invention.

FIG. 2—Exemplary Block Diagram of an Operating System and SD system

FIG. 2 illustrates an embodiment of the host device 100 featuring an USB-to-SDIO bridge (UTSB), an operating system running a driver for a USB SDIO device, and the SD system 150. Thus, in the embodiment of FIG. 2, the SD system 150 utilizes USB.

As shown, the host device 100, which may be a Linux host device, may be modified to accommodate a USB host controller 116 communicating directly with a UTSB bridge 154 (in the SD system 150). In FIG. 2, the components represented by the rectangles with dashed lines (110, 112, and 124) indicate where changes may be implemented over previous systems in order to provide SDIO support over a USB interface. When using a Linux operating system, host device 100 may be implemented on any hardware that supports, or can be modified to support a Linux operating system, and may be configured to run user applications 104 using network services. Additionally, the SD driver stack 108 may instead correspond to an MMC driver stack.

As indicated above, alternate embodiments may also be modified according to the structure disclosed in FIGS. 1 and 2, for operating systems other than Linux (e.g. Microsoft Windows operating systems or Apple OS-X, etc). For alternate operating systems, the SDIO card driver (which may support WiFi, Bluetooth, ZigBee, RS232, or any other communications or device protocol) 106 may be drivers functioning within the given operating system, and custom host controller driver 110 and SD Over USB (SDOU) class driver 112 may be appropriately configured to properly operate within the given operating system. Accordingly, host device 100 may be any host system in which custom drivers 110 and SDOU class driver 112 have been adapted to operate within the specific operating system running on host device 100, and interface with SD driver stack 108 and SDIO card driver 106. Furthermore, SDIO card driver 106 is shown as a WiFi SDIO driver for purposes of illustration for detailing interfacing with SD system 150, and thus SDIO driver 106 is not limited to WiFi drivers, and may be interpreted to represent all possible SD or SDIO drivers functioning within the given operating system.

The host device 100 may have a driver stack, shown as SD driver stack 108. In embodiments directed at a Linux operating system, the SD driver stack may be an MMC driver stack 108 configured for a Linux kernel 2.6.24+, for example. Normally, SDIO card driver 106 may be expected to issue commands to an SDIO interface. However, as shown in FIG. 2, custom host controller driver 110 (e.g., within the SD driver stack 108) may instead receive those SDIO commands and wrap them into packets that may be transmitted over USB, e.g., using the custom host controller driver 110. These packets may be interpreted as conforming to a new USB Device Class, which may be called "SD over USB" (SDOU) as shown in FIG. 2. The new SDOU device class may be loaded as part of USB driver stack 114 of the operating system in the form of SDOU class driver 112. However, in further embodiments, the custom host controller driver 110 and the SDOU class driver may be both incorporated in the SD driver stack 108 or the USB driver stack 114. Alternatively, the two may be combined into a single entity that is external to either or both of the SD driver stack 108 and the USB driver stack 114. Thus, the division shown in FIG. 2 is exemplary only and alternatives are envisioned. In another possible embodiment, the SDOU device class may be replaced by a Mass Storage Device class driver and the wrapped commands generated by the custom host controller driver 110 tunneled to the SD system 150 via SCSI Pass Through.

In the embodiment shown, the USB stack 114 may communicate via USB host controller 116 with the SD system 150, e.g., connected to the USB port. More specifically, as shown, USB host controller may be interfacing with USB device 118 (e.g., user input devices 125 and 130 and/or display 115), and the SD system 150. More or less USB devices and hubs may be coupled to host device 100. For example, there may be an open USB port 120, as shown.

As shown in FIG. 2, SD system 150 may have a USB Hub/Card reader 154 that may include UTSB to handle the SD/SDIO commands transmitted by SD/SDIO drivers 106. Within SD system 150, the UTSB Bridge in USB/Hub card reader 154 may interface, e.g., directly, with SDIO function 156 (e.g., which may implement WiFi, Ethernet, GPS, etc.) and SD flash memory 158. Note that the SD flash memory 158 and SDIO function 156 may be removable (e.g., as a user insertable/removable card) or non-removable (e.g., as a hard drive), as desired. Note further that the SD system may include more slots or memories (e.g., other than SDIO function 156 and SD flash memory 158) and/or may not include either of the function 156 or memory 158 shown. Thus, FIG. 2 illustrates an exemplary SD system 150 which includes two exemplary SD functionalities.

Figure 3A:
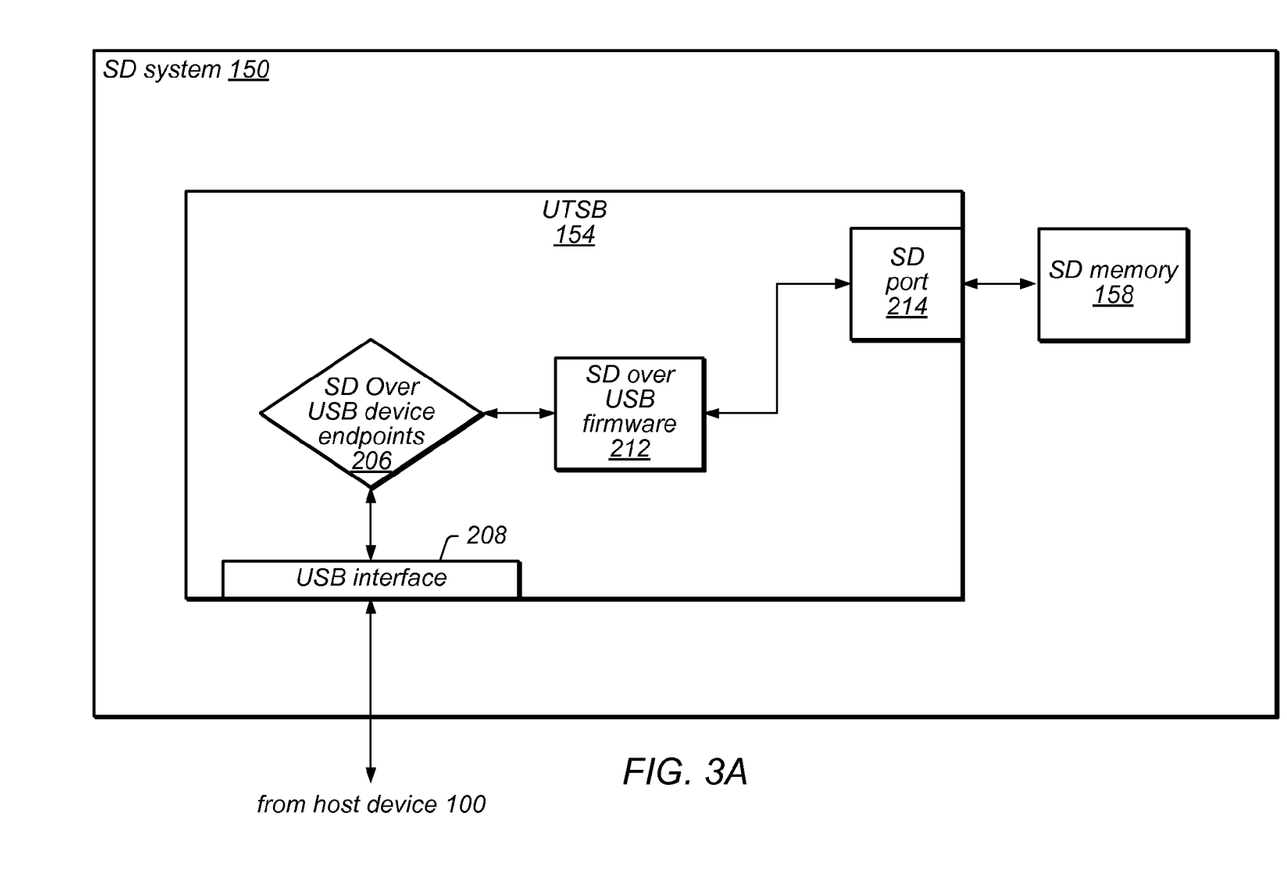
FIGS. 3A and 3B illustrate functional block diagrams of a two SD systems, according to some embodiments of the present invention.
Figure 3B:
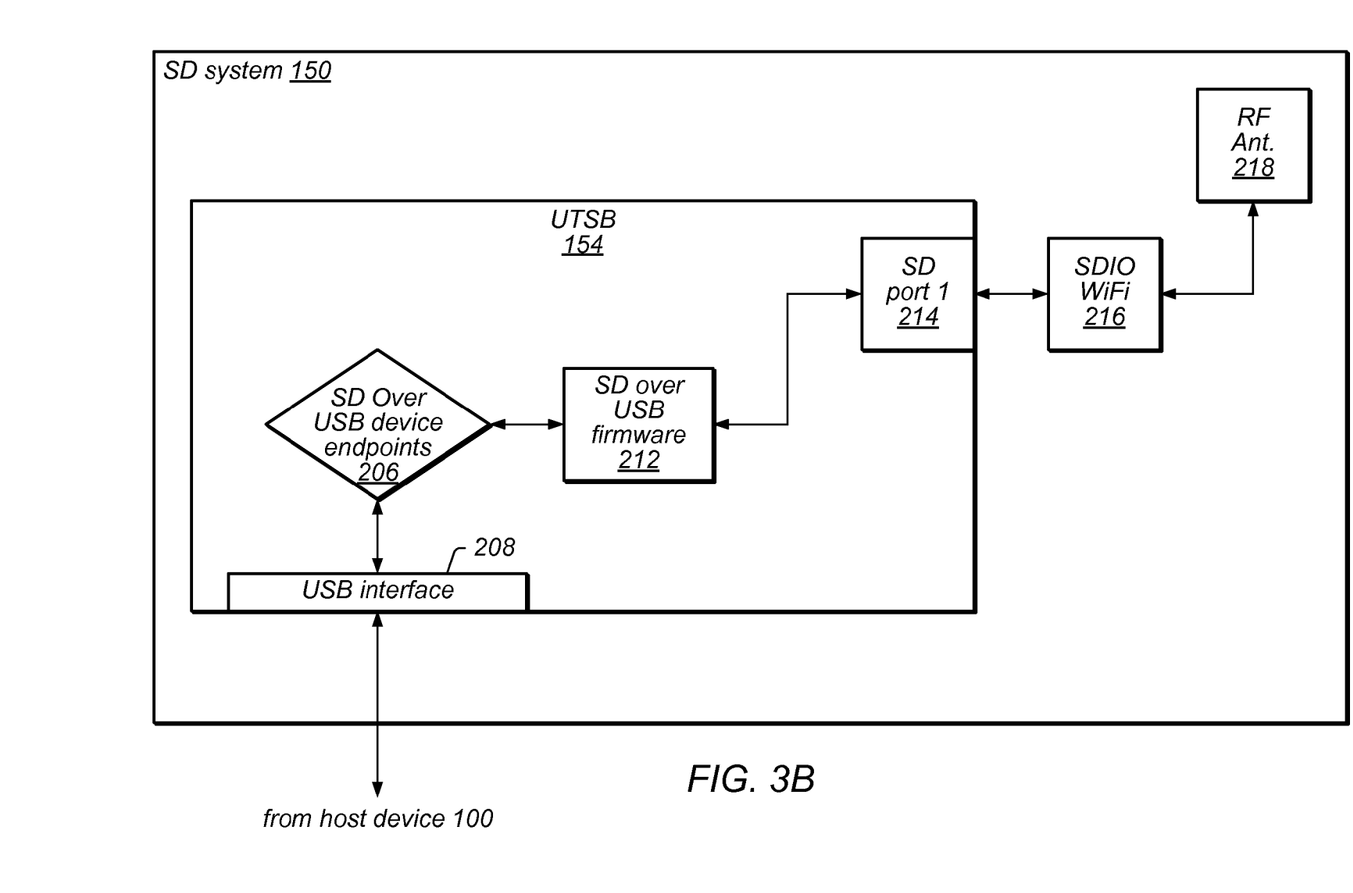

FIGS. 3A and 3B—Exemplary Block Diagrams of the SD system

FIGS. 3A and 3B illustrate exemplary block diagrams of the SD system 150. As shown, SD system 150 may be adapted to implement the "SD over USB" device class in its firmware, as exemplified by SDOU Firmware element 212. In one set of embodiments, SDOU Firmware 212 may operate to extract the SD commands from the USB packets transmitted from the host device 100, and transmit those commands directly to the SD port 214. In another embodiment, SD system 150 may be adapted to implement the Mass Storage Device class and SCSI Pass Through in its firmware, as exemplified by SDOU Firmware element 212.

As shown, SD system 150 may incorporate USB Hub/Card reader 154 (which may be an integrated circuit, or IC and/or internal or external software) that implements the new USB device class. Basically, the endpoints 206, protocol and software layer may be defined to closely match SD/SDIO commands, using USB as pipe for SDIO commands. This may also allow re-use of SDIO based host driver code. SDIO commands transmitted from the host device 100 may be received as USB packets by the SD system 150 through USB interface 208 to SDOU Device Endpoints block 206, from which SDOU Firmware 212 may extract the SD commands, and transmit the SD commands via SD port 214.

As shown in FIGS. 3A and 3B, UTSB 154 represents hardware that may implement the USB to SD Bridge. In one set of embodiments, the hardware may be an integrated circuit implementing USB upstream port 208 that may connect to a host computer (e.g. the host device 100), and may includes firmware 212 for the SD over USB device class. The other side of UTSB 154 may be fitted with an SD port 214 where an SDIO device may be plugged in.

For example, in FIG. 3A, the SD port 214 may couple to SD memory 158, which as described above, may be removable or non-removable, as desired.

Alternatively, or additionally, the SD port 214 may couple to some SD functionality (similar to SD function 156 described above). In the embodiment of FIG. 3B, the SD port 216 may couple to SDIO WiFi 216 which, in turn, may be coupled to RF Antenna 218. In some embodiments, both UTSB 154 and SDIO (WiFi) device interface 216 may be built onto a single module, however UTSB 154 may also be a separate component. Similar embodiments apply to FIG. 3A and variations thereon. Thus, the provided Figures are for illustration purposes only, and those skilled in the art will appreciate other variations and combinations of hardware and software (firmware) that may be possible for implementing the USB-to-SD device class as disclosed herein.

Figure 4:
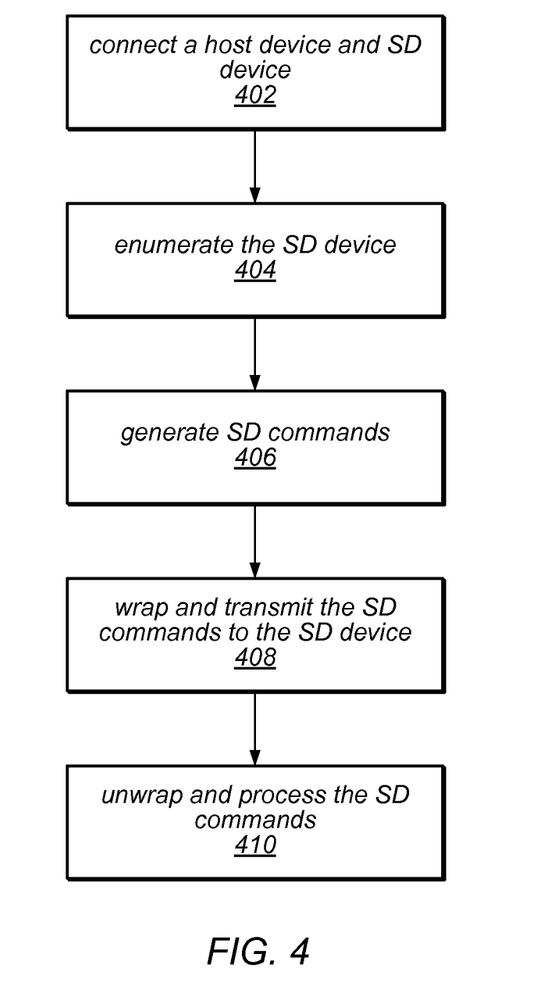
FIG. 4 is a block diagram illustrating an embodiment of a method for communicating SD over USB.

FIG. 4—Method for Communication SD over USB

FIG. 4 illustrates a method for communicating SD over USB. The method shown in FIG. 4 may be used in conjunction with any of the systems or devices described herein, among other devices. In various embodiments, some of the method elements shown may be performed concurrently, in a different order than shown, or may be omitted. Additional method elements may also be performed as desired. As shown, this method may operate as follows.

In 402, a host device (e.g., the host device 100) may be coupled or connected (e.g., wired or wirelessly) to an SD system (e.g., the SD system 150). The host device and the SD system may be coupled via USB, e.g., a USB cable connected to both the host device and the SD system. However, as indicated above, there may be intervening devices between the host device and the SD system.

In 404, the SD system may be enumerated by the host device, e.g., according to USB standards, such as USB 2.0 or USB 3.0, among other possibilities. During enumeration, the SD system may identify itself as an SD system, a mass storage class device, etc. In some embodiments, the SD system may automatically (e.g., via query) identify that it includes the SD over USB bridge or otherwise is able to perform the methods described herein.

In 406, the host device may generate one or more SD or SDIO (referred to interchangeably) commands. More particularly, the host device (e.g., an application executing on the host device) may issue commands to an SD (or SDIO) interface, and, in 408, these commands may be wrapped into USB packets (e.g., by the custom host controller driver), which conform to the SD over USB driver class. The host device may include a USB driver stack which includes an SD over USB device class and an SD driver stack which includes a custom host controller driver. The SD over USB device class and the custom host controller driver may enable the transfer of SD commands to the SD system via USB.

In one embodiment, the SD commands may be wrapped one at a time or a plurality at a time. More specifically, one or more SD commands may be generated, and those one or more SD commands may be wrapped in USB packets. Note that the number of SD commands and USB packets may or may not be 1:1. For example, a plurality of SD commands may be wrapped in one USB packet, or a plurality of USB packets may be used to wrap an SD command. Alternatively, there may be one USB packet for each SD command, as desired. These USB packets may be provided to the SD system.

In some embodiments, the SD commands may be for performing a variety of different SD actions or functions. For example, where the SD system includes or communicates with an SD memory (e.g., an SD flash memory), the commands may be for reading or writing to the SD memory. Similarly, where the SD system includes SDIO functionality (e.g., to communicate with another device, e.g., via WiFi or Ethernet or to perform GPS functionality, the SD commands may be used to interact with or control such functionality. The SD commands may also include supervisory commands (e.g., for data aggregation). In one embodiment, such a supervisory command may instruct the SD system (e.g., the UTSB bridge device of the SD system) to repeatedly read data from an SDIO device until termination condition is reached (e.g., when a communications FIFO on the device is empty), and return the collected data to the host device. Supervisory commands may be particularly relevant for SDIO devices which perform communication, e.g., network communication, and/or for any device that performs many repeated similar small tasks which terminate upon a specific condition or set of conditions. Supervisory commands may also be used for SD device initialization.

Additionally, the host device may be configured to analyze the SD command(s) before wrapping them. For example, the host device may be configured to reorder the commands, repackage the commands, combine commands (e.g., aggregate similar or adjacent commands), eliminate commands (e.g., that are equivalent), adjust block sizes of commands, fragment commands, etc., e.g., to improve or optimize performance. For example, the host device may analyze the commands and determine that by reordering the commands a more efficient data transfer may occur. Accordingly, the host device may reorder the commands to achieve the more efficient data transfer. The host device may also analyze the commands and determine that a single command should be fragmented, e.g., for faster data access. In one particular example, the host device (e.g., the custom host controller driver) may analyze a command to read 1 kilobyte of data from an SD memory. However, the host device may be aware that the SD system is able to read two 512 byte block reads faster than a single 1 kilobyte read. Accordingly, the host device may divide the 1 kilobyte read into two 512 byte reads, but may ultimately combine the result to provide the issuer of the command the 1 kilobyte read. Thus, the modification of the commands may be transparent to the hardware or software issuing the SD commands.

Thus, in 406 and 408, the host device may transmit the SD commands to the SD system, e.g., via USB packets.

In 410, the SD system may receive the communication from the host device, e.g., via USB. More particularly, the SD system may receive USB packets that include SD commands, e.g., wrapped in the USB packets, as indicated in 406 and 408 above. Upon reception, the SD commands may be unwrapped and processed by the SD system.

Similar to descriptions provided above regarding FIG. 3, the SD system may include a USB interface and logic (e.g., which may be circuitry or a processor and memory) coupled to the USB interface with endpoints which may be configured to operate as an SD over USB device class. The SD over USB device endpoints may be configured for processing the USB packets which include the SD commands. More particularly, the SD system may include an SD interface which may receive SD commands extracted from the USB packets. In one embodiment, the extraction may be performed based on programming instructions stored in a memory element coupled to the SD over USB logic described above. These instructions may be executable to extract the SD commands. However, in further embodiments, such extraction may be programmed in hardware, e.g., as circuits, gate arrays (e.g., field programmable gate arrays (FPGAs)), etc.

Similar to the host device described above (e.g., additionally or alternatively), the SD system may be configured to analyze the SD command(s) after unwrapping them, e.g., but before processing them. For example, the SD system may be configured to reorder the commands, repackage the commands, combine commands (e.g., aggregate similar or adjacent commands), eliminate commands (e.g., that are equivalent), adjust block sizes of commands, fragment commands, etc., e.g., to improve or optimize performance. For example, the SD may analyze the commands and determine that by reordering the commands a more efficient data transfer may occur. Accordingly, the SD may reorder the commands to achieve the more efficient data transfer. The SD may also analyze the commands and determine that a single command should be fragmented, e.g., for faster data access. In one particular example, the SD system (e.g., the UTSB) may analyze a command to read 1 kilobyte of data from an SD memory (or SD communication protocol). However, the SD system may determine that it is able to read two 512 byte block reads faster than a single 1 kilobyte read. Accordingly, the SD system may divide the 1 kilobyte read into two 512 byte reads, but may ultimately combine the result to provide the host device the 1 kilobyte read. Thus, the changing of the commands may be transparent to the host device (or the hardware or software issuing the SD commands).

The SD system may perform one or more actions based on the communication from the host device. For example, the SD system may execute or perform the SD commands provided in the USB packets. Alternatively, or additionally, the SD commands may be transmitted to other logic (e.g., the SDIO interface) for further transmission or processing. For example, the SDIO interface may provide the SD commands to an SD memory. In further embodiments, the SD commands may be provided to other functionality, e.g., WiFi circuitry or other circuitry, e.g., for transmission.

The SD system may further provide information back to the host device based on the communication, e.g., to provide requested information stored on the SD system (or a memory inserted into the SD system).

406-410 above may be performed a plurality of times throughout a session between the host device and SD system to perform any of various actions, e.g., transmitting and receiving information (such as pictures, documents, music files, etc.) from the SD system, updating the firmware of the SD system, etc.

Advantages

The UTSB may facilitate keeping the majority of the device drivers for a given SDIO device intact, requiring changes only in the lowest hardware adaptation layer to put a USB wrapper around the native SD commands. These commands may be sent over USB-to-SD card reader devices that may include various embodiments of a UTSB, where they may be unwrapped and transmitted to the SD port as if the port were native to the host controller. Additionally, these SD/SDIO commands may be packaged into groups of commands, or transactions, to optimize performance. For example, the host driver may instruct the UTSB bridge device to repeatedly read data from the SDIO device until a communications FIFO on the device is empty (corresponding to a termination condition), and return the collected data to the host.

Various embodiments, using a UTSB as disclosed herein, offer faster and more efficient solutions than those offered by standard SD card readers, which require implementation of custom firmware for each SDIO device attached. Most current USB oriented solutions have negative performance impact as they issue multiple small commands with no attempt at optimization. Such solutions would use regular USB device classes, such as Mass Storage Class, and would have to rely on Vendor Specific Commands to control the device attached to it. As disclosed herein, various embodiments may be designed using a new generic class of USB devices that can be serviced by a relatively standard USB device driver stack. This stack may enable the provider of an SDIO device to easily modify its device driver without extensive changes to the device's driver architecture. Previous solutions could have negative cost impact (e.g. using a standard PCI/PCIe SD host controller), and/or negative performance impact (e.g. limited bus speed/width). Additionally, previous solutions which issue multiple small commands are un-optimized and have negative performance impacts.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

We claim:

1. A non-transitory computer accessible memory medium storing program instructions, wherein the program instructions are executable to:

perform enumeration with a Secure Digital (SD) system, wherein the SD system is configured as to receive SD commands over USB (universal serial bus);

generate one or more SD commands;

analyze the one or more SD commands to improve performance, wherein said analyzing comprises determining whether to fragment a first SD command of the one or more commands into a first plurality of SD commands;

modify the one or more SD commands based on said analyzing, thereby generating a plurality of modified SD commands, wherein said modifying the one or more SD commands comprises generating the first plurality of SD commands from the first SD command, wherein the plurality of modified SD commands comprises the first plurality of SD commands;

wrap the plurality of modified SD commands into a corresponding plurality of USB packets; and transmit the plurality of USB packets to the SD system, wherein the SD system is configured to extract the plurality of modified SD commands from the plurality of USB packets.

2. The memory medium of claim 1, wherein said modifying further comprises one or more of:

reordering the SD commands;

aggregating at least two of the SD commands to a single SD command; or eliminating at least one SD command.

3. The memory medium of claim 1, wherein the one or more SD commands comprises a supervisory command, wherein the SD system comprises a communication Secure Digital Input Output (SDIO) device, wherein the supervisory command instructs the communication SDIO device to read data until a termination condition is reached.

4. The memory medium of claim 1, wherein the one or more SD commands comprises a supervisory command, wherein the supervisory command specifies a task which requires a plurality of SD commands.

5. The memory medium of claim 1, wherein the memory medium stores an operating system that includes a custom host controller driver, wherein the custom host controller driver is configured to perform said wrapping.

6. The memory medium of claim 1, wherein the memory medium stores a USB driver stack, wherein the USB driver stack comprises an SD over USB class driver, wherein the one or more USB packets conform to the SD over USB class driver.

7. A method, comprising:

a host device performing enumeration with a device, wherein the device is configured to receive Secure Digital (SD) commands over USB (universal serial bus);

the host device generating one or more SD commands;

the host device analyzing the one or more SD commands to improve performance, wherein said analyzing comprises determining whether to fragment a first SD command of the one or more commands into a first plurality of SD commands;

the host device modifying the one or more SD commands based on said analyzing, thereby generating a plurality of modified SD commands, wherein said modifying the one or more SD commands comprises generating the first plurality of SD commands from the first SD command, wherein the plurality of modified SD commands comprises the first plurality of SD commands;

the host device wrapping the plurality of modified SD commands into a corresponding plurality of USB packets;

the host device transmitting the plurality of USB packets to the device, wherein the device is configured to extract the one or more SD commands from the one or more USB packets.

8. The method of claim 7, wherein said modifying comprises one or more of:
reordering the SD commands;
aggregating at least two of the SD commands to a single SD command; or
eliminating at least one SD command.

9. The method of claim 7, wherein the one or more SD commands comprises a supervisory command, wherein the SD system comprises a communication Secure Digital Input Output (SDIO) device, wherein the supervisory command instructs the communication SDIO device to read data until a termination condition is reached.

10. The method of claim 7, wherein the one or more SD commands comprises a supervisory command, wherein the supervisory command specifies a task which requires a plurality of SD commands.

11. A system comprising:
a USB (universal serial bus) port;
a processor configured to run an operating system comprising a USB driver stack loaded with an SD over USB (Secure Digital over USB) device class; and
a memory medium coupled to the processor and configured to store programming instructions executable by the processor to:
generate SD (Secure Digital) commands;
analyze the one or more SD commands to improve performance, wherein said analyzing comprises determining whether to fragment a first SD command of the one or more commands into a first plurality of SD commands;
modify the one or more SD commands based on said analyzing to improve performance, thereby generating a plurality of modified SD commands, wherein said modifying the one or more SD commands comprises generating the first plurality of SD commands from the first SD command, wherein the plurality of modified SD commands comprises the first plurality of SD commands; and
wrap the plurality of modified SD commands into USB packets that can be transmitted over USB, wherein the USB packets conform to the SD over USB device class;
wherein the USB driver stack is configured to communicate with a device connected to the USB port, wherein the device is configured to extract and process the plurality of modified SD commands from the USB packets.

12. A method, comprising:
a device performing enumeration with a Secure Digital (SD) system, wherein the SD system is configured as to receive SD commands over USB (universal serial bus);
the device receiving one or more USB packets which comprise one or more SD commands;
the device extracting the one or more SD commands from the one or more USB packets, wherein the SD commands are configured for performing an SD action;
the device analyzing the one or more SD commands to improve performance, wherein said analyzing comprises determining whether to fragment a first SD command of the one or more commands into a first plurality of SD commands;
the device modifying the one or more SD commands based on said analyzing, thereby generating a plurality of modified SD commands, wherein said modifying the one or more SD commands comprises generating the first plurality of SD commands from the first SD command, wherein the plurality of modified SD commands comprises the first plurality of SD commands;
the device wrapping the plurality of modified SD commands into a corresponding plurality of USB packets; and
the device transmitting the plurality of USB packets to the SD system, wherein the SD system is configured to extract the plurality of modified SD commands from the plurality of USB packets.

13. The method of claim 12, wherein said modifying comprises:
reordering the SD commands;
aggregating at least two of the SD commands to a single SD command; or
eliminating at least one SD command.

14. A non-transitory computer accessible memory medium storing program instructions, wherein the program instructions are executable to:
perform enumeration with a Secure Digital (SD) system, wherein the SD system is configured as to receive SD commands over USB (universal serial bus);
generate a plurality of SD commands;
analyze the plurality of SD commands to improve performance, wherein said analyzing comprises determining whether to reorder the plurality of SD commands;
modify the plurality of SD commands based on said analyzing, thereby generating a plurality of modified SD commands, wherein said modifying the plurality of SD commands comprises reordering the plurality of SD commands;
wrap the plurality of modified SD commands into a corresponding plurality of USB packets; and
transmit the plurality of USB packets to the SD system, wherein the SD system is configured to extract the plurality of modified SD commands from the plurality of USB packets.

15. A method, comprising:
a device performing enumeration with a Secure Digital (SD) system, wherein the SD system is configured as to receive SD commands over USB (universal serial bus);
the device receiving one or more USB packets which comprise a plurality of SD commands;
the device extracting the plurality of SD commands from the one or more USB packets, wherein the SD commands are configured for performing an SD action;
the device analyzing the one or more SD commands to improve performance, wherein said analyzing comprises determining whether to reorder the plurality of SD commands;
the device modifying the one or more SD commands based on said analyzing, thereby generating a plurality of modified SD commands, wherein said modifying the plurality of SD commands comprises reordering the plurality of SD commands;
the device wrapping the plurality of modified SD commands into a corresponding plurality of USB packets; and
the device transmitting the plurality of USB packets to the SD system, wherein the SD system is configured to extract the plurality of modified SD commands from the plurality of USB packets.

16. A non-transitory computer accessible memory medium storing program instructions, wherein the program instructions are executable to:

perform enumeration with a Secure Digital (SD) system, wherein the SD system is configured as to receive SD commands over USB (universal serial bus);

generate a plurality of SD commands;

analyze the plurality of SD commands to improve performance, wherein said analyzing comprises determining whether to aggregate at least two of the plurality of SD commands;

modify the plurality of SD commands based on said analyzing, thereby generating one or more modified SD commands, wherein said modifying the plurality of SD commands comprises aggregating the at least two of the plurality of SD commands;

wrap the one or more modified SD commands into a corresponding one or more USB packets; and transmit the one or more of USB packets to the SD system, wherein the SD system is configured to extract the one or more modified SD commands from the one or more USB packets.

17. A method, comprising:

a device performing enumeration with a Secure Digital (SD) system, wherein the SD system is configured as to receive SD commands over USB (universal serial bus);

the device receiving one or more USB packets which comprise a plurality of SD commands;

the device extracting the plurality of SD commands from the one or more USB packets, wherein the SD commands are configured for performing an SD action;

the device analyzing the one or more SD commands to improve performance, wherein said analyzing comprises determining whether to aggregate at least two of the plurality of SD commands;

the device modifying the one or more SD commands based on said analyzing, thereby generating one or more modified SD commands, wherein said modifying the one or more SD commands comprises aggregating the at least two of the plurality of SD commands the device wrapping the plurality of modified SD commands into a corresponding plurality of USB packets; and the device transmitting the plurality of USB packets to the SD system, wherein the SD system is configured to extract the plurality of modified SD commands from the plurality of USB packets.

18. A non-transitory computer accessible memory medium storing program instructions, wherein the program instructions are executable to:

perform enumeration with a Secure Digital (SD) system, wherein the SD system is configured as to receive SD commands over USB (universal serial bus);

generate a plurality of SD commands;

analyze the plurality of SD commands to improve performance, wherein said analyzing comprises determining whether to eliminate a first SD command of the plurality of SD commands;

eliminate the first SD command from the plurality of SD commands to generate a first one or more commands, wherein said eliminating is based on said analyzing;

wrap the first one or more SD commands into a corresponding one or more USB packets; and transmit the one or more of USB packets to the SD system, wherein the SD system is configured to extract the first one or more SD commands from the one or more USB packets.

19. A method, comprising:

a device performing enumeration with a Secure Digital (SD) system, wherein the SD system is configured as to receive SD commands over USB (universal serial bus);

the device receiving one or more USB packets which comprise a plurality of SD commands;

the device extracting the plurality of SD commands from the one or more USB packets, wherein the SD commands are configured for performing an SD action;

the device analyzing the one or more SD commands to improve performance, wherein said analyzing comprises determining whether to eliminate a first SD command from the plurality of SD commands;

the device eliminating the first SD command based on said analyzing;

the device wrapping the remaining of the plurality of modified SD commands into a corresponding plurality of USB packets; and the device transmitting the remaining of the plurality of USB packets to the SD system, wherein the SD system is configured to extract the plurality of modified SD commands from the plurality of USB packets.

* * * * *